(12) United States Patent
Harlow et al.

(10) Patent No.: US 6,442,265 B1
(45) Date of Patent: Aug. 27, 2002

(54) METHOD FOR DETECTING AND REDUCING FRAUDULENT TELEPHONE CALLS

(75) Inventors: John Bruce Harlow, Middletown; Robert Sayko, Colts Neck, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/306,090

(22) Filed: May 6, 1999

(51) Int. Cl.7 ............................................... H04M 3/00
(52) U.S. Cl. ..................... 379/189; 379/192; 379/145; 379/114.14
(58) Field of Search ................................ 379/189, 190, 379/191, 192, 196, 197, 198, 114.14, 127.02, 111, 112.04, 114.01, 114.04, 114.2, 145

(56) References Cited

U.S. PATENT DOCUMENTS

| | | | | |
|---|---|---|---|---|
| 5,495,521 A | * | 2/1996 | Rangachar | 379/93.04 |
| 5,596,632 A | * | 1/1997 | Curtis et al. | 379/189 |
| 5,602,906 A | * | 2/1997 | Phelps | 379/114 |
| 5,627,886 A | * | 5/1997 | Bowman | 379/111 |
| 5,706,338 A | * | 1/1998 | Relyea et al. | 379/189 |
| 5,805,686 A | * | 9/1998 | Moller et al. | 379/198 |
| 5,815,559 A | * | 9/1998 | Schnable | 379/112 |
| 5,864,613 A | * | 1/1999 | Flood | 379/188 |
| 5,907,803 A | * | 5/1999 | Nguyen | 455/410 |
| 5,978,670 A | * | 11/1999 | Casoli et al. | 455/411 |
| 6,185,416 B1 | * | 2/2001 | Rudokas et al. | 455/410 |

\* cited by examiner

Primary Examiner—Ahmad F. Matar
Assistant Examiner—Benny Q. Tieu
(74) Attorney, Agent, or Firm—Banner & Witcoff, LTD

(57) ABSTRACT

The losses sustained by telecommunications service providers attributable to unpaid, long-duration calls are reduced if such calls are carefully monitored. Upon the determination that a call might be fraudulent, the circuits carrying the call through a network or switching system comprising the network are automatically identified. The determination that a call might be fraudulent is forwarded to an administrator and, using information on the circuits carrying the call, the administrator can take affirmative steps to either tear down the call or further investigate whether the call is fraudulent.

36 Claims, 1 Drawing Sheet

METHOD FOR DETECTING AND REDUCING FRAUDULENT TELEPHONE CALLS

FIELD OF THE INVENTION

This invention relates to telecommunication services. In particular, this invention relates to a method of reducing financial losses suffered by telecommunications service providers from fraudulent, long-duration calls.

BACKGROUND OF THE INVENTION

Telecommunication service providers are frequently the victims of a variety of fraud schemes. One type of fraud is the long-duration call where a party initiates a call to another party and then maintains the call for hours and perhaps even days. During the course of a long-duration call, the caller frequently collects money from others for their use of the connection to the called location.

These long-duration calls are problematic for service providers because the telecommunications industry's network design philosophy prioritized the connection and maintenance of calls regardless of duration, not the tearing down of calls. Fraud-motivated individuals have taken advantage of the public switched telephone network's (PSTN) inability to terminate a call after it is made by initiating a call and thereafter never hanging up the phone. In many instances, these creative thieves sell communication service to others who wish to communicate with someone at the far end of the connection.

Once a call is established between a calling party and a called party, it is a very difficult, often manual, process for a service provider or a switching equipment operator to terminate a call through the PSTN. While call continuity is certainly essential, from the perspective of telecommunications service providers, the inability to terminate a call has at least one drawback, namely the inability to easily terminate long-duration calls.

Prior art fraud-prevention techniques attempt to prevent a fraudulent call from being made. Unfortunately, these prior art techniques are unable to identify in-progress calls as being fraudulent.

Some of the prior art fraud-prevention techniques are merely sound business practices that include credit checks of the credit worthiness of a subscriber; but even with these credit checks of prospective customers, fraudulent long-duration calls still occur. In many instances, telephone calling cards issued to legitimate customers are sometimes lost by, or stolen from, legitimate customers. A stolen calling card number enables the unauthorized calling card number user to place fraudulent calls. Legitimate businesses might have phone lines unknowingly tapped by determined service thieves and have long-duration calls debited to the business number.

In the case of long-distance services, an unscrupulous individual is able to place long-distance calls to virtually any location. Since most telecommunications service providers bill on a monthly basis, they will not know if they will get paid until weeks or months after the fraudulent calls. In any given monthly billing cycle, an unscrupulous user is able to use tens of thousands of dollars worth of long-distance telephone service. By re-selling phone service (even at steeply discounted rates) an unscrupulous customer may collect lots of money.

A method by which an in-progress call might be identified as fraudulent and thereafter stopped would be an improvement over the prior art. A method by which calls are evaluated on a call-by-call basis might provide system-wide fraud protection and further prevent fraud.

SUMMARY OF THE INVENTION

There is provided herein a method for detecting and reducing fraudulent calls in-progress through a telecommunications network.

Call duration is tracked by reading one or more database records wherein the start time of calls is recorded. After some predetermined amount of time has elapsed, data records that indicate whether a call is still being carried are checked. The predetermined time interval between the start time of a call and a subsequent check can be empirically determined to be sufficiently long such that calls that exceed this first threshold value are suspected to be fraudulent.

If after this first threshold time period has elapsed and the call is still in progress, then the call's status as a long-duration call can be brought to the attention of the telecommunications service provider for appropriate handling. Handling of a long-duration call may include monitoring it for fraudulent characteristics such as voice and/or data, and determining the number of different voices using the channel. If the service provider decides that the call is likely fraudulent, then the call may be terminated, manually or automatically.

In the preferred embodiment, the circuits through which a long-duration call is carried are identified. Equipped with such information, a service provider can terminate the call by appropriate instruction to the central processor controlling the circuits carrying the call.

DETAILED DESCRIPTION OF THE PREFERRED EMBODIMENT

Figure 1:
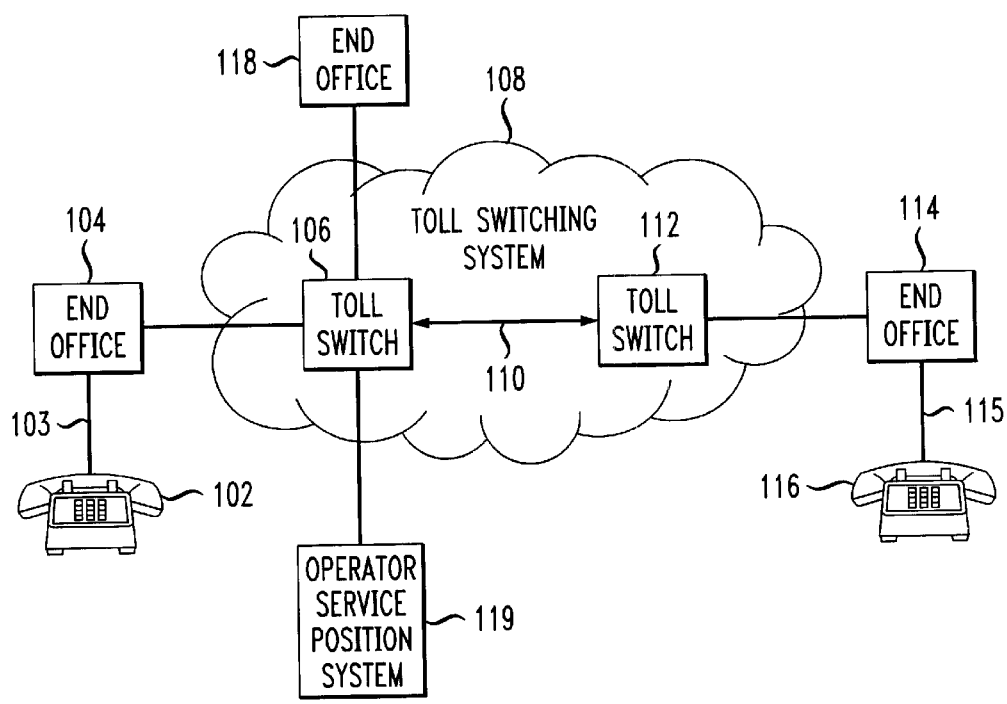
FIG. 1 shows a simplified diagram of a telecommunications network including depictions of connections between a calling party's phone and a called party's phone.

FIG. 1 shows a simplified diagram of a telephone network 100 through which telephone calls between a calling party 102 and a called party 116 are routed. The network 100 includes an end office 104, providing local telephone service to the calling party 102, typically through a hard-wired connection 103 extending from the end office 104.

The end office 104 is in turn coupled to a toll switching system 108 owned/or operated by a long distance service provider such as AT&T for instance. The switching system 108 provides long distance circuits 110 over which long distance calls are routed to a distant toll switch 112. While there is only one toll switch 106 shown as coupled to the end office 104, in an actual network, a single toll switch might be linked or coupled to several different end offices, such as 118, through a variety of media including twisted pair wires, cable, fiber optic cable or microwave. An operator service position system (OSPS) 119 coupled to the toll switch 106 permits a human operator to issue commands and perform other communications with the switching system 108.

The physical link between the calling party 102 and local service provider end office 104 might include a wire line link 103 but this connection 103 might also be wireless as in the case of mobile cellular or more recently fixed wireless or a cable television link. Similarly, the link 115 between the called party 116 and its local telephone service provider end office 114 might also be wireless or wire line. Similarly, the link 110 set up between the switches 106 and 112 might also be wireless, wire line, microwave, or fiber optic as well.

The above descriptions of the invention pertaining to circuit switched networks can also be applied to other types of communications networks including but not limited to connection-less, i.e., asynchronous transfer mode (ATM) packet or Internet Protocol, networks.

The toll switch 106 is shown being coupled to a distant, or far end, toll switch 112, which in turn is coupled to an end office 114 providing local telephone service to a called party 116. The toll switches 106, 112 and the end offices shown in FIG. 1 (104, 114 and 118) can be considered to comprise at least part of a public switched telephone network (PSTN), identified in FIG. 1 by reference numeral 108. As is well known in the art, the geographic distance separating the called party 116 and the calling party 102 might range from a few feet to thousands of miles and both the calling and the called parties can be located virtually anywhere on earth.

Figure 2:
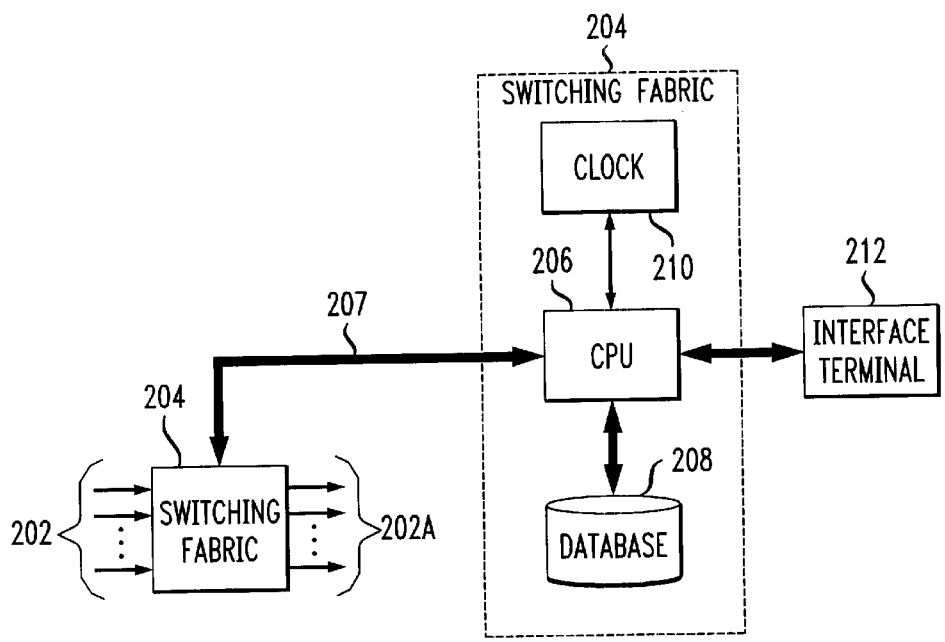
FIG. 2 shows a simplified diagram of an exemplary switching system that might be used in a telecommunications network, such as that shown in FIG. 1.

Referring to FIG. 2, there is shown a simplified diagram of a telephone switching system that might be used for either the end offices (104, 114, 118) or the toll switches (106, 112) depicted in FIG. 1. The block diagram of the switching system 200 depicted in FIG. 2 is exemplary and depicts only the essential elements of the switching system necessary for an understanding of the invention disclosed herein.

The switching system 200 necessarily includes at least a portion of a series of trunks and/or circuits 202 on which telephone calls are received and transmitted from a switching fabric 204. Switching fabric 204 can be considered to be the switching matrices by which incoming calls to the switching system 200 are routed to appropriate destinations via outgoing media 202A.

The circuits and switching matrices of the switching fabric 204 that route a call to its destination are set up by a central processor (computer) 206 over a series of control lines 207. The control lines 207 effectively couple the central processing unit 206 to the switching fabric 204.

The central processing unit 206 controls the switching system by executing commands or instructions of a computer program (not shown) required to operate the switching system 200. In the normal course of operating the switching system 200, the central processing unit or controller 206 reads, writes and creates data and/or database records 208. The database records 208 may be co-located inside or on-site with the switch. On the other hand, the database records 208 might also be located off-site, perhaps even being managed by another off-site CPU comprising part of a separate signaling network (not shown) such as an AT&T SS7 signaling network. These database records 208 include information on the start time of a call through the network 100. The database records 208 also include database records indicating whether the call is, or continues to be, carried through the network 100.

The database 208 might retain a number of different data items in a variety of format and media. The database record, for purposes of this invention, could include individual bytes stored in random access memory or on magnetic tape, disk, or other media. The database records, for purposes of this invention, might include multiple bytes of information or complete files, structures, tables or lists. Any of these might also be stored in random access memory, on magnetic tape or a disk. In reality, a large switching system might have several different databases, each for one or more particular purposes. Virtually all switching systems record the start and stop time of a call carried by the switch.

In order to prevent or minimize fraudulent long-duration calls, the invention requires that the controller 206 consult a database record within the database(s) 208 to determine a start time for a call through the network depicted in FIG. 1.

Some time after identifying the start time of a call through the network, the controller 206 is programmed to interrogate or query another database record in order to determine if the call is still being carried through the network 100 by the switching system 200. This first determination of the elapsed time from the start of the call, also referred to as a check interval, is made in order to make a threshold determination that the call might be fraudulent and this determination might be made in a number of ways. For example, as depicted in FIG. 2, one method to determine the elapsed time of a call is for the CPU 206 to read a clock 210 maintaining an appropriate representation of the time of the call duration.

After the check interval has expired, the current call duration is compared to an empirically determined threshold time value, referred to herein as the fraud threshold duration value. Based upon empirical data, calls longer than the fraud threshold duration value are likely to be fraudulent.

The fraud threshold duration value is empirically determined using historical data on call duration as it relates to at least one of the calling and called parties. Some factors considered include geographical areas where the parties are located, the parties' classes of service (e.g., business vs. residential) etc. The threshold duration value is preferably empirically determined from historical data to indicate the likelihood that the call exceeding this value is too long and might therefore be fraudulent.

The fraud threshold duration time value is stored in program memory (not shown) or alternatively stored in a database 208 or even stored in some register within the controller 206. If the elapsed duration of the call being tested exceeds the empirically determined fraud threshold duration value, then the program within the controller 206 identifies the call to be excessively long in duration. Once a call is determined to be suspiciously long, the controller 206 thereafter queries other database records to identify the particular circuits (trunks, trunk groups, time slots, switching fabric components etc.) over which the long-duration call is being carried by the switch 200.

Once the hardware circuits (incoming and outgoing trunks and trunk groups, switching circuits and other hardware components) of a call are known, the call through the network switch 200 can be terminated a number of ways. The circuits carrying the long-duration call are identified and logged for use by the switching system operator.

By way of an appropriate command to the controller 206 from a maintenance position 212, an operator for the telephone network service provider can order the controller 206 to terminate the call in progress. For example, the equipment handling the call can be forced out of service by the controller 206 via commands issued to the switching fabric 204 over the control bus 207. Alternatively, software for the controller 206 might be written to query a record indicating whether a call is fraudulent and, if other software makes such a determination, call tear-down software might terminate the call automatically.

In the preferred embodiment, for calls through the system 200, the controller 206 checks time values indicative of a fraudulent call. The check is a threshold call duration timer. If the threshold time is exceeded, the call is considered suspiciously long.

In the preferred embodiment, time values beyond which a call is considered to be suspicious are preferably set by the telecommunications service provider through a switching system user interface terminal 212. If database records 208 are outside of the switch 200, then the user interface is to the controller of 208 (not shown).

Historical data supports the notion that certain types of calls are inherently more lengthy than others. For instance, data transmission calls are typically longer than telephone conversations. Similarly, international calls are longer than domestic calls. The countries of origination and destination of a call can be considered in the determination of whether a call might be fraudulent.

In addition to considering the country of origin and termination, the determination of whether a call is fraudulent may be made more reliably if the call under suspicion is monitored. A human operator at the maintenance position 212 or the controller 206 may automatically attempt to identify whether a conversation is in progress at any given time. By attempting to keep track of how many conversations or how many different voices have been carried during the duration of the call, additional data on the likelihood of fraud can be obtained. For instance, the controller 206 might be programmed to perform Markov modeling or a Fourier analysis on the signals on the voice path in an attempt to identify the number of persons speaking during the call. By appropriately programming the controller, it would be possible to record and keep track of the voices or voice patterns of the speakers during a telephone conversation. If the number of different voices exceeded some threshold, then the possibility that the call may be fraudulent increases.

If the call appears to be a data call, as indicated by certain patterns of tones, a decision might be made by the telecommunications service provider that a data call is not fraudulent because the files being transported over the network require a significant amount of time. A more reliable determination of a call being fraudulent might be made possible by repetitively checking the call's duration time and using several different time-of-call values. Each of the check interval timers and the fraud threshold duration timers identified above are checked at least once.

Still other information related to fraudulent calls can be obtained by historical data of other fraudulent calls between an originating calling area and a destination calling area. Fraudulent call schemes might be more commonplace in some cities. The originating prefix and the destination prefix might be indicative of the likelihood of the call being fraudulent.

If it is determined that a call is likely fraudulent, an indication of the likelihood of the call being fraudulent can be passed to the telecommunications service provider automatically through the controller 206 or to a maintenance position 212. The controller 206 could be programmed to automatically terminate the call; alternatively, an alarm message displayed or enunciated at the maintenance position 212 might reserve the decision to terminate the call for a human operator.

In the preferred embodiment, once a call is determined to be fraudulent based upon one or more of the above-identified factors, a controller is preferably programmed to record the identity of the hardware (202, 202A and 204) of the switching system carrying the call. Armed with this information, a fraudulent call or a suspiciously long call can be manually or automatically torn down.

It is well known that unscrupulous telephone service resellers quickly learn the operational practices of telecommunications service providers. In many instances, long-duration calls are terminated by these individuals just prior to when an audit of a long-duration call might begin. By randomly varying the first predetermined time (the check interval) when we check whether the call is still in progress, interlopers and service thieves will be less likely to predict when an audit of a long-duration call might occur. By randomly varying the time at which a call might be considered fraudulent (the threshold duration), a telecommunications service provider is more likely to catch fraudulent, long-duration calls as they are in progress.

Of course, the random determination of audit times would have limits in that these pseudo random or substantially random threshold values would need to be at least a minimum value greater than the statistically likely duration length of a call. Both the check duration value and the threshold time values might be randomly varied individually or jointly.

By implementing a routine or even random audit of calls that exceed a predetermined threshold value length of time, a telecommunications service provider can more closely watch the services that it is providing. Calls that run more than several hours or days in length are likely to be fraudulent and never paid for. In order to lessen the likelihood that the service provider will sustain a financial loss, the service provider at least is given an opportunity to tear down an excessively long-duration call or alternatively to contact the parties to, e.g., verify billing information. Once the call is terminated, billing records stored elsewhere can preclude the controller 206 from re-establishing a call placed by a party who is significantly in arrears in his payments to the service provider.

What is claimed is:

1. In a telephone network wherein telephone calls are routed through said network between a telephone switching system entry point and a destination, a method of reducing fraudulent, long-duration calls comprising the steps of:
   a. querying a first database record, at least once, for the start time of a call through said network;
   b. at a first predetermined time after the start time of said call, querying a second database record at least once to determine if said call is still being carried through said network;
   c. If after said predetermined time, said call continues to be carried through said network then:
      i) determining the elapsed duration of the call;
      ii) comparing the elapsed duration of the call to a threshold duration value, said threshold duration value being a substantially random value;
      ii) if the elapsed duration of the call exceeds the threshold duration value then:
         (1) identifying said call to be an excessive-duration call.

2. The method of claim 1 further comprising the step of:
   (2) querying at least a third database record for information identifying network circuits through which said call is carried;
   after identifying said call to be an excessive-duration call.

3. The method of claim 1 further comprising the steps of:
   (2) querying at least a third database record for information identifying network circuits through which said call is carried;
   (3) providing the network routing information and call duration information to a network operator;
   after identifying said call to be an excessive-duration call.

4. The method of claim 1 wherein said first predetermined time is a telecommunications service provider-specified value.

5. The method of claim 1 wherein said first predetermined time is determined by whether said call is a data call.

6. The method of claim 1 wherein said first predetermined time is determined by whether said call is an international call.

7. The method of claim 1 wherein said first predetermined time is a substantially random value.

8. The method of claim 1 wherein said threshold duration value is determined by whether said call is a data call.

9. The method of claim 1 wherein said threshold duration value is determined by whether said call is an international call.

10. The method of claim 1 further including the step of terminating said call through said network if after said threshold duration value of time, said call continues to be carried through said network.

11. The method of claim 1 further including the step of empirically determining a likelihood of said call being fraudulent based upon historical data of calls placed to and received from said destination.

12. The method of claim 1 further including the step of empirically determining the likelihood of said call being fraudulent based upon historical data of fraudulent calls originating from a predetermined geographic region.

13. The method of claim 1 further including the step of monitoring said call for the presence of voice.

14. The method of claim 1 further including the steps of:
   a) identifying the number of different voices carried during a predetermined time period of said call;
   b) if the number of different voices carried during said predetermined time period of said call exceeds a threshold value, identifying said call as a fraudulent call.

15. The method of claim 1 wherein said network operator is a network resource capable of terminating said call.

16. The method of claim 1 further including a step of monitoring said call for the presence of data.

17. The method of claim 1, wherein said random value is a pseudo random value.

18. In a telephone network wherein telephone calls are routed through said network between a telephone network entry point and a network destination, a method of reducing fraudulent, long-duration calls comprising the steps of:
   a) in a network element processing calls, querying a first data record for the start time of a call through said network;
   b) at a first predetermined time after the start time of said call, querying a second data record to determine if said call is still being carried through said network;
   c) if after said predetermined time, said call continues to be carried through said network then:
      i) creating a long-duration data record within said network identifying said call as a long-duration call;
      ii) iteratively monitoring long-duration call records within said network to determine the long-duration calls that might be fraudulent;
      iii) if a long-duration call record is determined to exceed a threshold duration value, said threshold duration value being a substantially random value then:
         (1) identifying said call to be an excessive-duration call;
         (2) querying at least a third database record for information identifying network circuits through which said call is carried;
         (3) providing the network routing information and call duration information to a network operator.

19. The method of claim 18 wherein said first predetermined time is a telecommunications service provider-specified value.

20. The method of claim 18 wherein said first predetermined time is determined by whether said call is an international call.

21. The method of claim 18 wherein said first predetermined time is a substantially random value.

22. The method of claim 18 wherein said threshold duration value is determined by whether said call is a data call.

23. The method of claim 18 wherein said threshold duration value is determined by whether said call is an international call.

24. The method of claim 18 wherein said first predetermined time is determined by whether said call is a data call.

25. The method of claim 18 further including the step of terminating said call through said network if after said threshold duration value of time, said call continues to be carried through said network.

26. The method of claim 18 further including the step of empirically determining a likelihood of said call being fraudulent based upon historical data of calls placed to and received from said destination.

27. The method of claim 18 further including the step of empirically determining the likelihood of said call being fraudulent based upon historical data of fraudulent calls originating from a predetermined geographic region.

28. The method of claim 18 further including the step of monitoring said call for the presence of voice.

29. The method of claim 18 further including the steps of:
   d) identifying the number of different voices carried during a predetermined time period of said call;
   e) if the number of different voices carried during said predetermined time period of said call exceeds a threshold value, identifying said call as a fraudulent call.

30. The method of claim 18 wherein said network operator is a network resource capable of terminating said call.

31. The method of claim 18 further including a step of monitoring said call for the presence of data.

32. The method of claim 18, wherein said random value is a pseudo random value.

33. A computer-readable medium containing instructions for controlling a computer system to reduce fraudulent, long-duration calls in a telephone network wherein telephone calls are routed through said network between a telephone switching system entry point and a destination, by reducing fraudulent, long-duration calls, by:
   a. querying a first database record, at least once, for a start time of a call through said network;
   b. at a first predetermined time after the start time of said call, querying a second database record at least once to determine if said call is still being carried through said network;
   c. if after said predetermined time, said call continues to be carried through said network then:
      i) determining an elapsed duration of the call;
      ii) comparing the elapsed duration of the call to a threshold duration value, said threshold duration value being a substantially random value;
      iii) if the elapsed duration of the call exceeds the threshold duration value then:
         (1) identifying said call to be an excessive-duration call.

34. The computer-readable medium of claim 32, wherein said random value is a pseudo random value.

35. A computer-readable medium containing instructions for controlling a computer system to reduce fraudulent, long-duration calls in a telephone network wherein telephone calls are routed through said network between a telephone switching system entry point and a destination, by:

a) in a network element processing calls, querying a first data record for a start time of a call through said network;

b) at a first predetermined time after the start time of said call, querying a second data record to determine if said call is still being carried through said network;

c) if after said predetermined time, said call continues to be carried through said network then:
   i) creating a long-duration data record within said network identifying said call as a long-duration call;
   ii) iteratively monitoring long-duration call records within said network to determine the long-duration calls that might be fraudulent;
   iii) if a long-duration call record is determined to exceed a threshold duration value, said threshold duration value being a substantially random value then:
      (1) identifying said call to be an excessive-duration call;
      (2) querying at least a third database record for information identifying network circuits through which said call is carried;
      (3) providing the network routing information and call duration information to a network operator.

36. The computer-readable medium of claim 35, wherein said random value is a pseudo random value.

* * * * *